Nov. 8, 1949  R. A. MURRAY, SR  2,487,465
VARIABLE AREA WING
Filed Dec. 27, 1946  2 Sheets-Sheet 1

Inventor
RILEY A. MURRAY, SR.

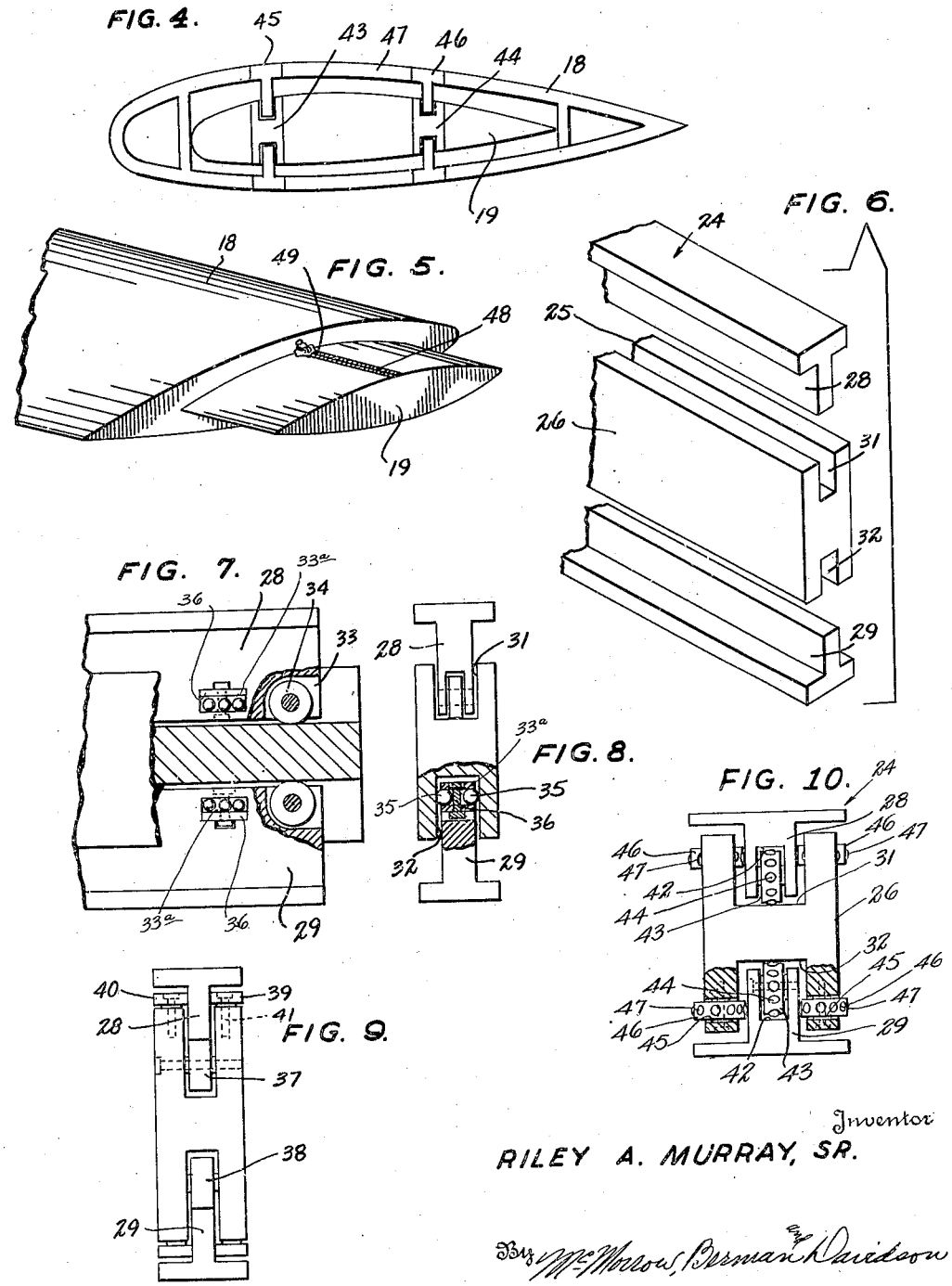

Patented Nov. 8, 1949

2,487,465

UNITED STATES PATENT OFFICE 2,487,465

VARIABLE AREA WING

Riley A. Murray, Sr., Emporium, Pa.

Application December 27, 1946, Serial No. 718,695

1 Claim. (Cl. 244—43)

This invention relates to airplanes, and more particularly to an auxiliary wing section for increasing the wing area to allow lower landing speeds and to decrease the wing area to attain higher speed in the air.

It is an object of the present invention to provide an auxiliary wing section which is of simple construction and which is installed in a simple manner within the ends of the main wing for sliding movement out of and into the main wing.

It is another object of the present invention to provide an auxiliary wing structure which can be readily adapted for connection to the beams of the main wing section and which are provided with a main beam member which will connect with the main beam member of the main wing in such a manner as to permit the sliding movement of the same thereover and wherein these members may contain supporting rollers and ball bearing units for taking up the side and vertical stresses imparted to the auxiliary wing, and without the need of other structures within the auxiliary wing to assume the load.

It is another object of the present invention to provide an arrangement in an auxiliary wing which has a channel member on it that will be opened as the wing is extended outwardly thereof, a device for closing the channel gap so that the flow of air over the top and bottom surfaces of the auxiliary wing will not be impaired or stalled.

For other objects and for a better understanding of the invention, reference may be had to the following details of construction taken in connection with the accompanying drawings, in which:

Figure 4 is a transverse view of a main wing structure and an auxiliary wing structure wherein two sliding members are employed upon the auxiliary wing member matching respectively with the two beams of the main wing structure.

Figure 5 is a perspective view of a main wing structure and an auxiliary wing structure and showing one way to effect the closure of the gap provided by the sliding member automatically as the auxiliary wing is extended, the device taking the form of a zipper fastening arrangement.

Figure 6 is an exploded view of fragments of the main beam of the main wing and of the beam of the auxiliary wing, or sliding member, which is slid out of the main beam of the auxiliary member.

Figure 7 is a fragmentary view, with portions broken away and shown in section, and showing the roller and ball bearing support for the sliding member of the auxiliary wing.

Figure 8 is an end elevational view, with portions broken away, to show ball bearing units serving to guide the auxiliary sliding member upon the main beam of the main wing.

Figure 9 shows a modified form of the connection of the auxiliary slide member with the main beam of the main wing.

Figure 10 is another modified form of the connection of the auxiliary slide member with the main beam of the main wing.

Figure 1:
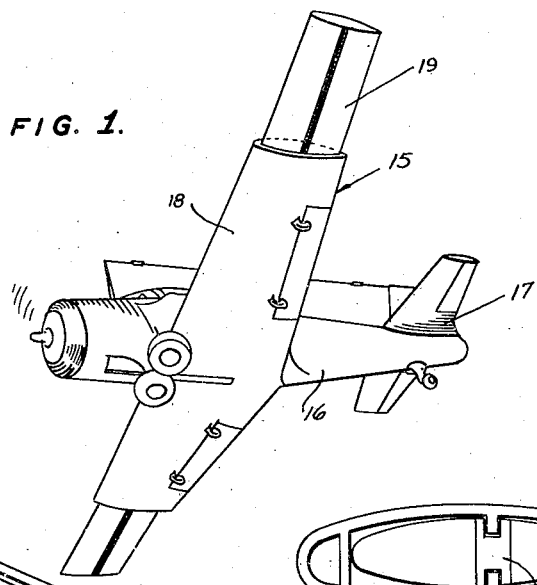
Figure 1 is a perspective view of an airplane looking upwardly upon the bottom of the same and with the auxiliary wings extended from the main wings and in position to carry some of the load of the plane.
Figure 2:
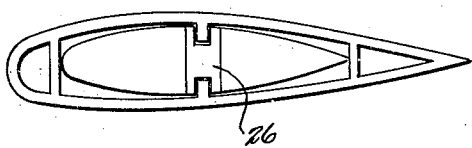
Figure 2 is a transverse cross-sectional view taken through a main wing structure and through an auxiliary wing structure wherein but a single sliding support is used.
Figure 3:
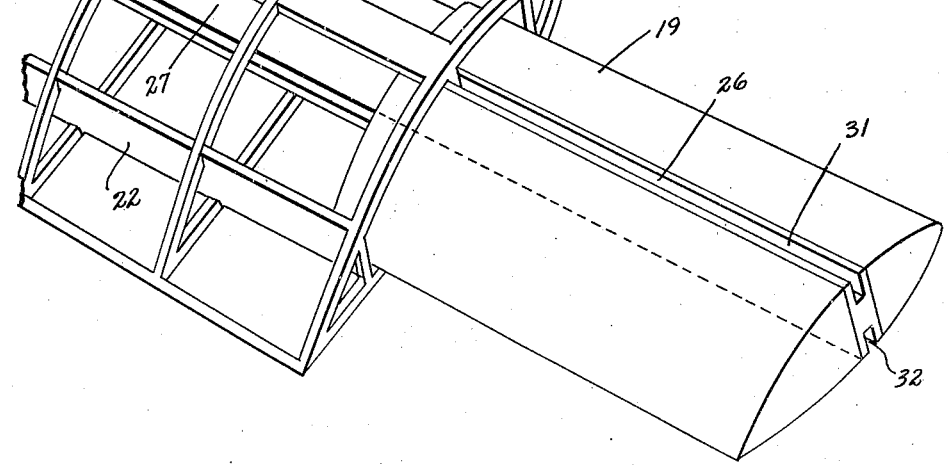
Figure 3 is an enlarged perspective view looking upon the open framework of a main beam structure and upon an auxiliary wing which has been slid out of the main wing.

Referring now to the figures, 15 represents an airplane comprising a fuselage 16 with tail sections 17 thereon and with main wing portions 18 out of which may be extended auxiliary wing portions or sections 19.

The main wing structure comprises the usual plurality of airfoil frame shapes 21 and the longitudinally extending beams 22, 23 and the main I-beam 24. The I-beam 24 has its web slotted, as indicated at 25, and the auxiliary wing structure 19 has a member 26 of H-section extending longitudinally through it and serving as the main frame member thereof. This member 26 is slidable along the I-beam 24. The member, however, is longer than the auxiliary wing structure 19 and is provided accordingly with an extension 27 for carrying the load when the auxiliary wing 19 has been extended out of the main wing.

The I-beam 24 will have web portions 28 and 29 above and below the slots 25. These web portions serve to guide the slide 26 and maintain the wing structure against sidewise displacement.

The member 26 has an upper groove 31 and a lower groove 32. The web portion 28 will extend down into the groove 31 while the web portion 29 will extend upwardly into the bottom groove 32. In Figures 7 and 8 there is shown the connection of the H-member 26 to the web portions 28 and 29. The web portion 28 and the web portion 29 both have a recess 33 in which is disposed a roller 34 adapted to bear against the bottom of the groove 31 or 32. Likewise, the portions 28 and 29 have pockets 33a, in each of which two rows of balls 35 are arranged to assume the lateral thrust of the H-member or slide 26 upon the sides of the grooves. The adjacent rows of balls 35 are divided from each other by a partition 36.

In Figure 9, there is shown a form of the invention where the rollers are carried in the grooves 31 and 32 and upon the slide 26. Such rollers are indicated at 37 and 38. The ends of the web portions or the slot walls will bear upon these rollers. Ball bearing units 39 and 40 are attached to the top and bottom of the H-shaped member 26 by means of bolts 41. It will thus be apparent that the H-shaped member 26 can slide out of the beam 24 very easily and the weight assumed by the auxiliary wing will be nicely transmitted to the main beam 24 of the main wing.

Figure 10 illustrates another modified form of the connection of the auxiliary slide member 26 with the main beam 24 of the main wing. In this modification the web portions 28 and 29 of the main beam 24 are provided in their inner faces with longitudinal grooves 42, in each of which a ball bearing 43 is rotatably mounted, so that the balls 44 thereof engage the bottoms of the grooves 31 and 32.

Each flange of the H-shaped slide 26 is provided with a slot 45 adjacent its edge and in each of these slots a ball bearing 46 is rotatably mounted, so that the balls 47 thereof engage the outer surfaces of the web portions 28 and 29.

Referring now particularly to Figure 4, there is shown a double slide arrangement. There are two members 43 and 44 slidingly engaging respectively with two beams 45 and 46 of a main wing structure 47. With the larger airplanes this arrangement can be used.

In either instance the same means for effecting the sliding movement of the auxiliary wing within the main wing can be used. Any hydraulic or electrically operated device which is commonly used in airplanes for effecting the adjustment of various structures thereon can be connected to the auxiliary wings to extend them out of and into the wings.

Referring now particularly to Figure 5, there is shown opposed hooked sections arranged across the top of the upper groove in the member 26, the hooked sections interlockingly receiving therebetween a slide 49 which is dependingly carried by the main wing 18. The hooked sections are closed by the slide as the auxiliary wing 19 is extended, and are opened as the auxiliary wing is withdrawn or retracted.

Having now described my invention, I claim:

In an airplane, a main wing having a beam extending longitudinally therethrough, an auxiliary wing structure slidable into and out of the main wing and having a longitudinally extending slide member extending therethrough and having sliding engagement with the longitudinally extending beam of the main wing, said slide of the auxiliary wing being grooved to receive portions of the main wing beam, closure means secured to said slide member at opposite sides of the grooves extensible over the grooves when the auxiliary wing has been extended to close the same, and separable when the auxiliary wing has been retracted to open the same, said closure means comprising opposed hooked sections secured to opposite sides of the grooves and a slide dependingly carried by the main wing and interlockingly engaging said hooked sections.

RILEY A. MURRAY, Sr.

REFERENCES CITED

The following references are of record in the file of this patent:

UNITED STATES PATENTS

| Number | Name | Date |
| --- | --- | --- |
| 2,002,944 | Hathorn | May 28, 1935 |
| 2,222,997 | Bellanca et al. | Nov. 26, 1940 |
| 2,292,613 | Chapman | Aug. 11, 1942 |
| 2,344,044 | Koch | Mar. 14, 1944 |